(12) United States Patent
Ju

(10) Patent No.: US 12,176,532 B2
(45) Date of Patent: Dec. 24, 2024

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventor: Seo Hee Ju, Daejeon (KR)

(73) Assignee: LG Chem, Ltd., Seoul (KR)

( * ) Notice: Subject to any disclaimer, the term of this patent is extended or adjusted under 35 U.S.C. 154(b) by 941 days.

(21) Appl. No.: 16/754,582

(22) PCT Filed: Oct. 19, 2018

(86) PCT No.: PCT/KR2018/012454
§ 371 (c)(1),
(2) Date: Apr. 8, 2020

(87) PCT Pub. No.: WO2019/078689
PCT Pub. Date: Apr. 25, 2019

(65) Prior Publication Data
US 2020/0287213 A1    Sep. 10, 2020

(30) Foreign Application Priority Data

Oct. 20, 2017   (KR) .................. 10-2017-0136898
Oct. 19, 2018   (KR) .................. 10-2018-0125096

(51) Int. Cl.
*H01M 4/525*   (2010.01)
*C01B 35/12*   (2006.01)
(Continued)

(52) U.S. Cl.
CPC ........... *H01M 4/525* (2013.01); *C01B 35/121* (2013.01); *C01G 53/50* (2013.01); *H01M 4/0471* (2013.01);
(Continued)

(58) Field of Classification Search
None
See application file for complete search history.

(56) References Cited

U.S. PATENT DOCUMENTS 6,203,947 B1 *   3/2001   Peled ................ H01M 4/045
                                                429/231.95
2007/0082265 A1   4/2007   Itou et al.
(Continued)

FOREIGN PATENT DOCUMENTS

CN   102496710 A   6/2012
CN   106025190 A   10/2016
(Continued)

OTHER PUBLICATIONS

Machine Translation of CN-108206278-A from Espacenet originall published to Du Jun. 2018 (Year: 2018).*
(Continued)

*Primary Examiner* — Ula C Ruddock
*Assistant Examiner* — Mary Grace Byram
(74) *Attorney, Agent, or Firm* — Lerner David LLP

(57) ABSTRACT

A positive electrode active material includes a nickel-containing lithium transition metal oxide containing nickel in an amount of 60 mol % or more based on a total number of moles of transition metals excluding lithium, and a lithium-containing inorganic compound layer formed on a surface of the nickel-containing lithium transition metal oxide, wherein the positive electrode active material has a first peak in a range of 5 eV or less, a second peak in a range of 7 eV to 13 eV, and a third peak in a range of 20 eV to 30 eV when
(Continued)

intensity is measured by X-ray photoelectron spectroscopy, and the first peak has a maximum value of 80% to 120% with respect to the third peak. A method of preparing the positive electrode active material, and a positive electrode and a lithium secondary battery are also provided.

12 Claims, 3 Drawing Sheets

(51) Int. Cl.

| | | |
|---|---|---|
| *C01G 53/00* | (2006.01) | |
| *H01M 4/04* | (2006.01) | |
| *H01M 4/131* | (2010.01) | |
| *H01M 4/1391* | (2010.01) | |
| *H01M 4/505* | (2010.01) | |
| *H01M 4/62* | (2006.01) | |
| *H01M 10/052* | (2010.01) | |
| *H01M 10/0525* | (2010.01) | |
| *H01M 10/42* | (2006.01) | |
| *H01M 4/02* | (2006.01) | |

(52) U.S. Cl.
CPC ......... *H01M 4/131* (2013.01); *H01M 4/1391* (2013.01); *H01M 4/505* (2013.01); *H01M 4/62* (2013.01); *H01M 4/628* (2013.01); *H01M 10/052* (2013.01); *H01M 10/0525* (2013.01); *H01M 10/4235* (2013.01); *C01P 2004/80* (2013.01); *C01P 2006/40* (2013.01); *H01M 2004/028* (2013.01); *H01M 2300/0008* (2013.01); *H01M 2300/0011* (2013.01)

(56) References Cited

U.S. PATENT DOCUMENTS

| | | | | |
|---|---|---|---|---|
| 2007/0154788 | A1* | 7/2007 | Hong | ............... H01M 4/13 |
| | | | | 429/185 |
| 2008/0063941 | A1* | 3/2008 | Itaya | ............... H01M 4/366 |
| | | | | 429/231.95 |
| 2012/0301786 | A1 | 11/2012 | Takamuku et al. | |
| 2014/0170494 | A1 | 6/2014 | Paulsen et al. | |
| 2014/0308572 | A1* | 10/2014 | Tsuchida | ............ H01M 4/0402 |
| | | | | 429/162 |
| 2015/0086840 | A1* | 3/2015 | Takami | ............... H01M 4/505 |
| | | | | 429/223 |
| 2016/0013476 | A1 | 1/2016 | Oh et al. | |
| 2016/0197346 | A1 | 7/2016 | Myung et al. | |
| 2016/0226066 | A1* | 8/2016 | Yamamoto | ............ H01M 4/131 |
| 2016/0285103 | A1 | 9/2016 | Shitaba et al. | |
| 2017/0200951 | A1 | 7/2017 | Hong et al. | |

FOREIGN PATENT DOCUMENTS

| | | | | |
|---|---|---|---|---|
| CN | 106654206 | A | | 5/2017 |
| CN | 108206278 | A * | 6/2018 | ........ H01M 10/0525 |
| JP | 2008071569 | A | | 3/2008 |
| JP | 2010118179 | A | | 5/2010 |
| JP | 2012089406 | A | | 5/2012 |
| JP | 2012142154 | A | | 7/2012 |
| JP | 2013037950 | A | | 2/2013 |
| JP | 2014022293 | A | | 2/2014 |
| JP | 2016184472 | A | | 10/2016 |
| KR | 20060121272 | A | | 11/2006 |
| KR | 20130135356 | A | | 12/2013 |
| KR | 20150018752 | A | | 2/2015 |
| KR | 20150050153 | A | | 5/2015 |
| KR | 20150050458 | A | | 5/2015 |
| KR | 101651338 | B1 | | 8/2016 |
| KR | 20160118081 | A | | 10/2016 |
| KR | 20170103505 | A | | 9/2017 |

OTHER PUBLICATIONS

A. N. Mansour, Characterization of LiNiO2 by XPS, Jul. 1, 1994, Surf. Sci. Spectra 3, 279-286 (Year: 1994).*
Chinese Search Report for Application No. 201880066201.8 dated Nov. 16, 2021, 3 pages.
International Search Report for Application No. PCT/KR2018/012454 dated Apr. 11, 2019, 2 pages.

* cited by examiner

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2018/012454, filed Oct. 19, 2018, which claims priority to Korean Patent Application No. 10-2017-0136898, filed Oct. 20, 2017, and Korean Patent Application No. 10-2018-0125096, filed Oct. 19, 2018, the disclosures of which are incorporated herein by reference.

TECHNICAL FIELD

The present invention relates to a positive electrode active material for a lithium secondary battery, a method of preparing the positive electrode active material, and a positive electrode for a lithium secondary battery and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium nickel cobalt metal oxide, in which a portion of nickel (Ni) is substituted with cobalt (Co), manganese (Mn), or aluminum (Al), has been developed.

However, with respect to the lithium nickel cobalt metal oxide, there is a limitation in that safety and life characteristics of the battery are rapidly degraded by an increase in interfacial resistance between an electrolyte and an electrode including an active material as charge and discharge are repeated, electrolyte decomposition due to moisture in the battery or other influences, degradation of a surface structure of the active material, and an exothermic reaction accompanied by rapid structural collapse, and such limitation is particularly more severe under high-temperature and high-voltage conditions.

In order to address such limitation, methods of not only improving structural stability of the active material itself by doping the lithium nickel cobalt metal oxide and improving surface stability by coating a surface of the lithium nickel cobalt metal oxide, but also increasing stability of an interface between the electrolyte and the active material have been proposed. Typically, a method of forming a coating layer on a surface by using a dry coating method during the synthesis of a positive electrode active material has been conducted. However, in this case, since it is not easy to uniformly form the coating layer on the surface, it is not fully satisfactory in terms of its effect and process.

Thus, there is a need to develop a positive electrode active material which includes a lithium nickel cobalt metal oxide, wherein a battery having reduced resistance as well as improved stability, life characteristics, and output characteristics may be prepared by forming a uniform coating layer on the surface of the lithium nickel cobalt metal oxide.

DISCLOSURE OF THE INVENTION

Technical Problem

An aspect of the present invention provides a positive electrode active material in which electrical conductivity is improved due to an improvement in valence electron density.

Another aspect of the present invention provides a method of preparing a positive electrode active material in which valence electron density of a coating layer formed may be improved by adjusting a pH of a suspension in which an aqueous inorganic acid solution and a nickel-containing lithium transition metal oxide are mixed.

Another aspect of the present invention provides a positive electrode for a lithium secondary battery which includes the positive electrode active material.

Another aspect of the present invention provides a lithium secondary battery including the positive electrode for a lithium secondary battery.

Technical Solution

According to an aspect of the present invention, there is provided a positive electrode active material including: a nickel-containing lithium transition metal oxide containing nickel in an amount of 60 mol % or more based on a total number of moles of transition metals excluding lithium; and a lithium-containing inorganic compound layer formed on a surface of the nickel-containing lithium transition metal oxide, wherein the positive electrode active material has a first peak in a range of 5 eV or less, a second peak in a range of 7 eV to 13 eV, and a third peak in a range of 20 eV to 30 eV when intensity is measured by X-ray photoelectron spectroscopy, and the first peak has a maximum peak value of 80% to 120% with respect to the third peak.

According to another aspect of the present invention, there is provided a method of preparing a positive electrode active material which includes: mixing an aqueous inorganic acid solution with a nickel-containing lithium transition metal oxide containing nickel in an amount of 60 mol % or more based on a total number of moles of transition metals excluding lithium to prepare a suspension having a pH of 8 to 12; forming a lithium-containing inorganic compound by reacting the lithium transition metal oxide with inorganic acid included in the aqueous inorganic acid solution; and drying and heat-treating the suspension to form a lithium-containing inorganic compound layer on a surface of the lithium transition metal oxide.

According to another aspect of the present invention, there is provided a positive electrode for a lithium secondary battery which includes the positive electrode active material according to the present invention.

According to another aspect of the present invention, there is provided a lithium secondary battery including the positive electrode according to the present invention.

Advantageous Effects

According to the present invention, since mobility of lithium ions is improved by coating a surface of a nickel-containing lithium transition metal oxide with a lithium-containing inorganic compound layer, charge and discharge efficiency may be improved and a positive electrode active material having reduced resistance may be prepared. Also, since a side reaction of the nickel-containing lithium transition metal oxide with an electrolyte solution included in a lithium secondary battery is prevented by the lithium-containing inorganic compound layer, stability of the positive electrode active material may be improved.

Furthermore, since the positive electrode active material may be prepared by using a suspension having a pH of 8 to 12 in which an inorganic acid is mixed with the nickel-containing lithium transition metal oxide, valence electron density of the coating layer formed may be improved. Accordingly, electrical conductivity of the positive electrode active material may be improved, and a battery having improved output characteristics may be prepared when the positive electrode active material is used in the battery.

MODE FOR CARRYING OUT THE INVENTION

Figure 1:
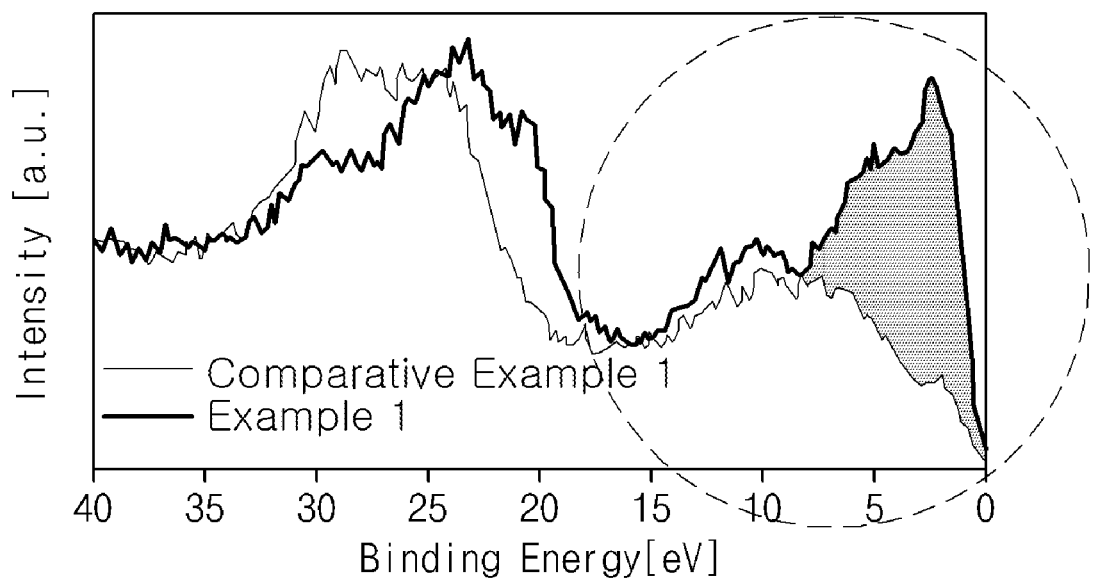
FIG. 1 is a graph illustrating X-ray photoelectron spectroscopy (XPS) spectrum of positive electrode active materials prepared in Example 1 and Comparative Example 1.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Throughout the present specification, the expression "X-ray photoelectron spectroscopy (XPS)" denotes one of analysis methods for analyzing a surface of a positive electrode material, wherein it is a surface analysis method using a principle that photoelectrons are emitted from surface atoms when a surface of a sample is irradiated with an X-ray beam (photons) having a constant energy. Since the energy of the irradiating X-ray beam is constant, energy required to emit inner shell electrons bound to an atomic nucleus, that is, binding energy of the electrons in the atom may be identified when kinetic energy of the photoelectron is measured. Since the binding energy is an intrinsic property of the atom emitting photoelectrons, an element constituting the surface may be identified by the binding energy, qualitative analysis of the sample is possible by the binding energy of the photoelectron, and the bonding state of the atoms may also be identified from a change in binding energy.

A positive electrode active material according to the present invention includes a nickel-containing lithium transition metal oxide containing nickel in an amount of 60 mol % or more based on a total number of moles of transition metals excluding lithium; and a lithium-containing inorganic compound layer formed on a surface of the nickel-containing lithium transition metal oxide, wherein the positive electrode active material has a first peak in a range of 5 eV or less, a second peak in a range of 7 eV to 13 eV, and a third peak in a range of 20 eV to 30 eV when intensity is measured by X-ray photoelectron spectroscopy, and the first peak has a maximum peak value of 80% to 120% with respect to the third peak.

Specifically, the positive electrode active material may include a nickel-containing lithium transition metal oxide containing nickel in an amount of 60 mol % or more, for example, 60 mol % to 99 mol % based on the total number of moles of transition metals excluding lithium. In a case in which the high amount of nickel is included as described above, capacity characteristics of a battery may be improved when the positive electrode active material is used in the battery.

The nickel-containing lithium transition metal oxide may include doping element $M^1$. For example, in a case in which the lithium transition metal oxide is doped with metallic element $M^1$, structural stability and surface stability of the lithium transition metal oxide may be secured, and, accordingly, life characteristics may be improved. For example, the doping element $M^1$ may be at least one selected from the group consisting of zirconium (Zr), boron (B), cobalt (Co), aluminum (Al), tungsten (W), magnesium (Mg), cerium (Ce), tantalum (Ta), titanium (Ti), strontium (Sr), barium (Ba), hafnium (Hf), fluorine (F), phosphorus (P), lanthanum (La), and yttrium (Y), and may preferably be at least one selected from the group consisting of Zr, Al, Co, F, and W.

The nickel-containing lithium transition metal oxide may be more preferably represented by Formula 1 below:

$$Li_{1+a}(Ni_b Co_c X_d M^1_e)_{1-a} O_2 \qquad [\text{Formula 1}]$$

in Formula 1, X is at least one selected from the group consisting of manganese (Mn) and Al, $M^1$ is at least one selected from the group consisting of Zr, B, Co, W, Mg, Ce, Ta, Ti, Sr, Ba, Hf, F, P, La, and Y, $0 \leq a \leq 0.1$, $0.6 \leq b \leq 1.0$, $0 \leq c \leq 0.3$, $0 \leq d \leq 0.3$, and $0 \leq e \leq 0.1$.

The nickel-containing lithium transition metal oxide may preferably be at least one selected from the group consisting of Li$_x$Ni$_{0.8}$Co$_{0.1}$Mn$_{0.1}$O$_2$ (1.0≤x≤1.10),
Li$_x$Ni$_{0.6}$Co$_{0.2}$Mn$_{0.2}$O$_2$ (1.0≤x≤1.10),
Li$_x$Ni$_{0.87}$Co$_{0.07}$Mn$_{0.06}$O$_2$ (1.0≤x≤1.10),
Li$_x$Ni$_{0.9}$Co$_{0.08}$Mn$_{0.05}$O$_2$ (1.0≤x≤1.10),
Li$_x$Ni$_{0.8}$Co$_{0.1}$Mn$_{0.1}$Al$_{0.05}$O$_2$ (1.0≤x≤1.10),
Li$_x$Ni$_{0.6}$Co$_{0.2}$Mn$_{0.2}$Al$_{0.05}$O$_2$ (1.0≤x≤1.10),
Li$_x$Ni$_{0.87}$Co$_{0.07}$Mn$_{0.06}$Al$_{0.03}$O$_2$ (1.0≤x≤1.10),
Li$_x$Ni$_{0.9}$Co$_{0.08}$Mn$_{0.05}$Al$_{0.03}$O$_2$ (1.0≤x≤1.10), and
Li$_x$Ni$_{0.9}$Co$_{0.03}$Mn$_{0.2}$Al$_{0.02}$O$_2$ (1.0≤x≤1.10).

Also, the positive electrode active material may include a lithium-containing inorganic compound layer formed on the surface of the nickel-containing lithium transition metal oxide.

Specifically, the lithium-containing inorganic compound layer may include at least one selected from the group consisting of Li$_3$BO$_3$, Li$_3$PO$_4$, LiPO$_3$, LiP$_2$O$_7$, α-Li$_4$B$_2$O$_5$, β-Li$_4$B$_2$O, Li$_6$B$_4$O$_9$, α-LiBO$_2$, Li$_2$B$_4$O$_7$, Li$_3$B$_7$O$_{12}$, LiB$_3$O$_5$, and Li$_2$B$_8$O$_{13}$. Since the lithium-containing inorganic compound layer is formed on the surface of the lithium transition metal oxide as described above, mobility of lithium ions may be improved, and, accordingly, electrical conductivity of the positive electrode active material may be improved to improve charge and discharge efficiency of a battery in which the positive electrode active material is used.

The lithium-containing inorganic compound layer may be uniformly formed across the entire surface of the lithium transition metal oxide.

The lithium-containing inorganic compound layer may be formed to a thickness of 1 nm to 200 nm, for example, 5 nm to 100 nm, and, in a case in which the thickness satisfies the above range, since the occurrence of a side reaction is suppressed by blocking a contact between the positive electrode active material and an electrolyte solution included in the lithium secondary battery, expansion of the battery may be suppressed when used in the battery. Thus, the life characteristics may be improved.

The positive electrode active material according to the present invention has a first peak in a range of 5 eV or less, a second peak in a range of 7 eV to 13 eV, and a third peak in a range of 20 eV to 30 eV when intensity is measured by X-ray photoelectron spectroscopy, and the first peak may have a maximum peak value of 80% or more, for example, 80% to 120% with respect to the third peak. Specifically, since the inorganic compound is formed on the surface of the lithium transition metal oxide, surface electron density of the positive electrode active material is increased, and thus, when the maximum peak value of one of the two peaks is 100% as described above in XPS measurement, the other peak may have a maximum peak value of 80% to 120%. In this case, a large amount of electrons in valence electron region at a surface of the positive electrode active material may be released as the surface electron density of the positive electrode active material is increased. That is, the higher the peak value measured in the XPS measurement is, the more the electron density is improved by the large amount of the electrons released from the valence electron region of the positive electrode active material, and, accordingly, electron mobility may be improved.

The expression "valence electron" denotes an electron located in the outermost shell of an atom in a ground state where energy is at its lowest state. In a case in which the valence electron density is high, it denotes that density of the electrons located in the outermost shell is high, and, accordingly, the mobility of the electrons may be improved.

For example, in a case in which the maximum peak value of one of the two peaks appeared when the intensity is measured by XPS is less than 80% of the other peak, an effect of improving electrical conductivity due to an increase in the valence electron density may not be achieved.

The positive electrode active material may have an electrical conductivity of 5 mS/cm to 30 mS/cm, which is measured after the positive electrode active material is prepared in a form of a pellet by compressing the positive electrode active material at a rolling load of greater than 0 kN and equal to or less than 20 kN. In a case in which the electrical conductivity measured after the positive electrode active material is prepared in the form of a pellet as described above satisfies the above range, resistance of the positive electrode active material may be reduced and the mobility of the lithium ions may be increased. Accordingly, output characteristics of a secondary battery, in which the positive electrode active material is used, may be improved.

Also, the present invention provides a method of preparing a positive electrode active material which includes: mixing an aqueous inorganic acid solution with a nickel-containing lithium transition metal oxide containing nickel in an amount of 60 mol % or more based on a total number of moles of transition metals excluding lithium to prepare a suspension having a pH of 8 to 12; forming a lithium-containing inorganic compound by reacting the lithium transition metal oxide with inorganic acid included in the aqueous inorganic acid solution; and drying and heat-treating the suspension to form a lithium-containing inorganic compound layer on a surface of the lithium transition metal oxide.

First, a suspension having a pH of 8 to 12 is prepared by mixing an aqueous inorganic acid solution with a nickel-containing lithium transition metal oxide containing nickel in an amount of 60 mol % or more, for example, 60 mol % to 99 mol % based on a total number of moles of transition metals excluding lithium.

Any compound, which exhibits high capacity characteristics by including nickel in an amount of 60 mol % or more, may be used as the nickel-containing lithium transition metal oxide without limitation, but the nickel-containing lithium transition metal oxide may preferably be represented by Formula 1 below:

Li$_{1+a}$(Ni$_b$Co$_c$X$_d$M$^1_e$)$_{1-a}$O$_2$ [Formula 1]

in Formula 1, X is at least one selected from the group consisting of Mn and Al, M$^1$ is at least one selected from the group consisting of Zr, B, Co, Al, W, Mg, Ce, Ta, Ti, Sr, Ba, Hf, F, P, La, and Y, 0≤a≤0.1, 0.6≤b≤1.0, 0≤c≤0.3, 0≤d≤0.3, and 0≤e≤0.1.

The aqueous inorganic acid solution may include at least one selected from the group consisting of boric acid (H$_3$BO$_3$), phosphoric acid (P$_2$O$_5$), hydrochloric acid, nitric acid, sulfuric acid, carbonic acid, hydrofluoric acid, and hydrobromic acid.

The aqueous inorganic acid solution may have a pH of greater than 6 and equal to or less than 10.

Also, the suspension having a pH of 8 to 12 may be prepared by mixing the nickel-containing lithium transition metal oxide in an amount of 50 parts by weight to 90 parts by weight, for example, 60 parts by weight to 80 parts by weight based on 100 parts by weight of the aqueous inorganic acid solution. For example, in a case in which the amount of the nickel-containing lithium transition metal oxide based on 100 parts by weight of the aqueous inorganic acid solution is outside the above range, the pH of the suspension prepared may be less than 8 or greater than 12.

Subsequently, the lithium transition metal oxide and the inorganic acid included in the aqueous inorganic acid solution react in the suspension having a pH of 8 to 12 to form a lithium-containing inorganic compound.

Particularly, in a case in which the pH of the suspension satisfies the above range, a lithium-containing inorganic compound may be uniformly formed on the surface of the nickel-containing lithium transition metal oxide by an acid-base reaction of inorganic acid in the suspension with a lithium salt dissociated on the surface of the nickel-containing lithium transition metal oxide, and, since the lithium-containing inorganic compound formed on the surface during this process is rearranged on the surface of the lithium transition metal oxide by the drying and heat treatment processes, a positive electrode active material having increased surface electron density may be prepared. For example, in a case in which the pH of the suspension is less than 8, the surface of the positive electrode active material may be damaged by high acidity of the aqueous inorganic acid solution. Also, in a case in which the pH of the suspension is greater than 12, the acid-base reaction may not occur smoothly.

For example, the lithium-containing inorganic compound may be formed by the following reaction.

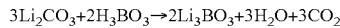

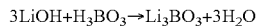

For example, in a case in which a coating layer including the lithium-containing inorganic compound is formed on the surface of the lithium transition metal oxide by using a dry process, an effect of improving surface electron density due to the rearrangement of the lithium-containing inorganic compound, which may be achieved when the coating layer is formed by the acid-base reaction of the suspension with a specific pH as in the present invention, may not be achieved, and the coating material may be present locally on the surface of the lithium transition metal oxide.

Also, in a case in which the pH of the aqueous inorganic acid solution is outside the range of the present invention, other side reactions may occur in addition to the above-described lithium-containing inorganic compound formation reaction. Accordingly, since by-products as well as the lithium-containing inorganic compound are formed on the surface of the lithium transition metal oxide, it may be difficult to achieve an effect of improving stability and an effect of improving mobility of lithium ions due to the formation of the lithium-containing inorganic compound as in the present invention.

Finally, a lithium-containing inorganic compound layer is formed on the surface of the lithium transition metal oxide by drying the suspension and performing a heat treatment at 200° C. to 500° C. for example, 250° C. to 350° C.

After drying the suspension, a solution (water) contained in the suspension may be removed by performing a heat treatment at 200° C. to 500° C., and the lithium-containing inorganic compound formed on the surface of the lithium transition metal oxide may be cured by the heat treatment to be formed as a lithium-containing inorganic compound layer. In this case, the formed lithium-containing inorganic compound layer may have a thickness of 1 nm to 200 nm, for example, 5 nm to 100 nm, and may be uniformly formed across the entire surface of the lithium transition metal oxide.

Also, provided is a positive electrode for a lithium secondary battery including the positive electrode active material according to the present invention. Specifically, provided is the positive electrode for a lithium secondary battery which includes a positive electrode collector and a positive electrode active material layer formed on the positive electrode collector, wherein the positive electrode active material layer includes the positive electrode active material according to the present invention.

In this case, since the positive electrode active material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a binder as well as a conductive agent, if necessary, in addition to the above-described positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

A suspension having a pH of 11 was prepared by mixing 100 g of $LiNi_{0.8}Co_{0.1}Mn_{0.1}O_2$ and 30 mL of a $H_3BO_3$ aqueous solution having a pH of 6.5. The suspension was subjected to a reaction for 0.5 hours, then dried at 150° C., and heat-treated at 300° C. to prepare a positive electrode active material having a surface on which a Li—B—O compound including $Li_3BO_3$ was formed to a thickness of 10 nm.

The above-prepared positive electrode active material, a carbon black conductive agent, and a PVdF binder were mixed in a weight ratio of 95:2.5:2.5 in an N-methylpyrrolidone solvent to prepare a composition for forming a positive electrode. A 20 μm thick Al current collector was coated with the composition for forming a positive electrode, dried, and then roll-pressed to prepare a positive electrode.

Lithium metal was used as a counter electrode.

After the above-prepared positive electrode and the lithium metal were stacked with a Celgard 2300 separator (Celgard, LLC) to prepare an electrode assembly, the electrode assembly was put in a battery case, and an electrolyte solution, in which 1 M $LiPF_6$ was dissolved in a mixed solvent in which ethylene carbonate (EC):ethyl methyl carbonate (EMC):diethyl carbonate (DEC) were mixed in a volume ratio of 40:30:30, was injected thereinto to prepare a lithium secondary battery.

Example 2

A positive electrode and a lithium secondary battery including the same were prepared in the same manner as in Example 1 except that a suspension having a pH of 11 prepared by mixing 100 g of $LiNi_{0.6}Co_{0.2}Mn_{0.2}O_2$ and 30 mL of a $H_3BO_3$ aqueous solution having a pH of 6.5 was used.

Comparative Example 1

$Ni_{0.8}Co_{0.1}Mn_{0.1}(OH)_2$ and $LiOH \cdot H_2O$ were mixed in a weight ratio of 1:1.03 and then sintered at 800° C. to prepare $LiNi_{0.8}Co_{0.1}Mn_{0.1}O_2$. The $LiNi_{0.8}Co_{0.1}Mn_{0.1}O_2$ was washed using distilled water at 25° C. or less. The washed $LiNi_{0.8}Co_{0.1}Mn_{0.1}O_2$ and $H_3BO_3$ were dry mixed in a weight ratio of 1:0.01 using an FM mixer and then heat-treated at 300° C. to prepare a positive electrode active material in which a Li—B—O compound including $LiBO_2$ and $Li_2B_4O_7$ on the surface thereof was non-uniformly formed on the surface of the $LiNi_{0.8}Co_{0.1}Mn_{0.1}O_2$. A positive electrode and a lithium secondary battery including the same were prepared in the same manner as in Example 1 except that the above-prepared positive electrode active material was used.

Comparative Example 2

A positive electrode and a lithium secondary battery including the same were prepared in the same manner as in Example 1 except that $LiNi_{0.8}Co_{0.1}Mn_{0.1}O_2$ of Example 1, in which a coating layer was not formed on the surface thereof, was used as a positive electrode active material.

Comparative Example 3

A positive electrode and a lithium secondary battery including the same were prepared in the same manner as in Example 1 except that a suspension having a pH of 7 prepared by mixing 100 g of $LiNi_{0.8}Co_{0.1}Mn_{0.1}O_2$ and 40 mL of a $H_3BO_3$ aqueous solution having a pH of 2 was used.

Comparative Example 4

A positive electrode and a lithium secondary battery including the same were prepared in the same manner as in Example 1 except that a suspension having a pH of 12.8 prepared by mixing 100 g of $LiNi_{0.8}Co_{0.1}Mn_{0.1}S_{0.05}O_2$ and 40 mL of a $H_3BO_3$ aqueous solution having a pH of 8 was used.

Experimental Example 1: X-ray Photoelectron Spectroscopy (XPS) of Positive Electrode Active Material With respect to the positive electrode active materials prepared in Example 1 and Comparative Example 1, intensities of the positive electrode active materials were measured by X-ray photoelectron spectroscopy using a K-alpha spectrometer (Thermo Scientific), and the resulting XPS graph is shown in FIG. 1.

From the experimental results, with respect to the positive electrode active material prepared in Example 1, a first peak appeared at 2 eV, a third peak appeared at 23 eV, wherein it may be confirmed that the first peak had the equivalent maximum peak value at a level of 90% of a maximum peak value of the third peak.

However, with respect to the positive electrode active material prepared in Comparative Example 1, a first peak did not appear at 5 eV or less, but appeared at 10 eV, and a second peak appeared in the region of 30 eV. Also, in this case, it was confirmed that the first peak had a maximum peak value that is about 50% of a maximum peak value of the second peak.

Experimental Example 2: Electrical Conductivity of Positive Electrode Active Material After each of the positive electrode active materials prepared in Example 1 and Comparative Examples 1 to 4 was prepared in the form of pellets by compressing each positive electrode active material at a rolling load of greater than 0 kN and equal to or less than 20 kN, electrical conductivities of each positive electrode active material were measured as in Table 1 and FIG. 2 by using a powder resistivity measurement system (MCP-T610, MITSUBISHI CHEMICAL ANALYTECH Co., Ltd).

TABLE 1

| | Electrical conductivity (mS/cm) | | | | |
|---|---|---|---|---|---|
| | 4 kN | 8 kN | 12 kN | 16 kN | 20 kN |
| Example 1 | 5.80 | 11.50 | 16.70 | 21.30 | 25.54 |
| Comparative Example 1 | 2.52 | 5.87 | 9.97 | 14.10 | 18.93 |
| Comparative Example 2 | 4.46 | 7.27 | 9.64 | 11.89 | 14.15 |
| Comparative Example 3 | 4.02 | 8.21 | 11.95 | 15.77 | 19.18 |
| Comparative Example 4 | 6.29 | 9.71 | 12.58 | 16.30 | 19.32 |

Figure 2:
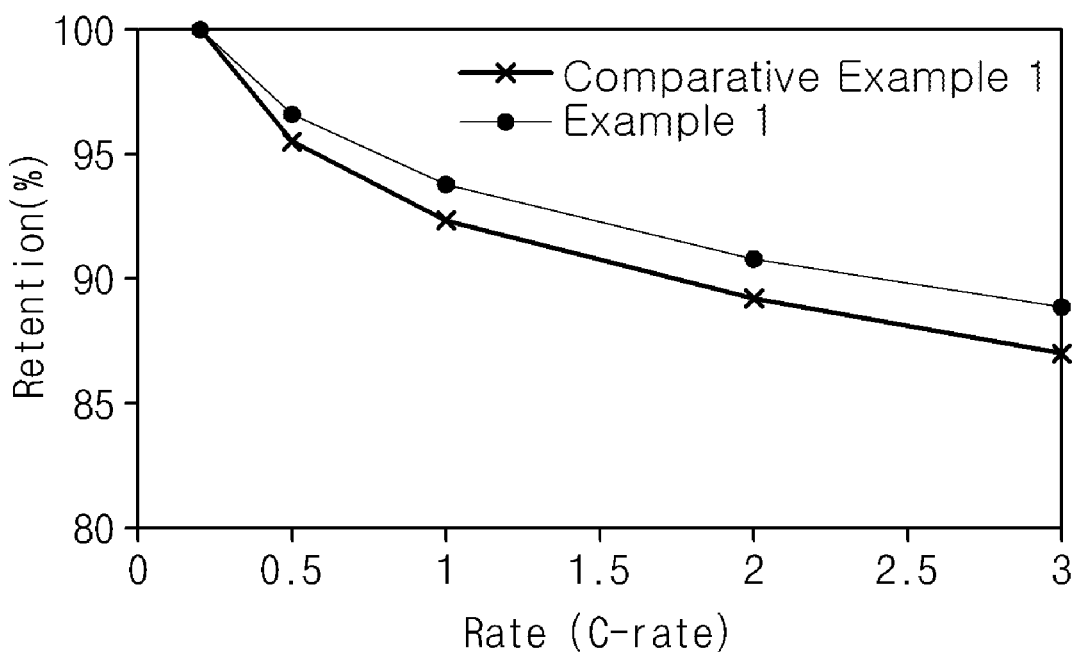
FIG. 2 is a graph illustrating life retentions of lithium secondary batteries prepared in Example 1 and Comparative Example 1 according to cycles.

As illustrated in Table 1 and FIG. 2, with respect to the positive electrode active material prepared in Example 1 of the present invention, it may be confirmed that electrical conductivities were better than those of the positive electrode active materials prepared in Comparative Examples 1 to 4 across the entire rolling load range from 4 kN to 20 kN. Particularly, it may be confirmed that a difference in electrical conductivity was more pronounced as the rolling load increased.

Experimental Example 3: Life Characteristics Evaluation

Life characteristics were measured for each of the lithium secondary batteries prepared in Examples 1 and 2 and Comparative Examples 1 to 4.

Specifically, each of the secondary batteries prepared in Examples 1 and 2 and Comparative Examples 1 to 4 was charged at a constant current of 1 C to 4.4 V at 25° C. and cut-off charged at 0.05 C. Thereafter, each secondary battery was discharged at a constant current of 1 C to a voltage of 3 V. The charging and discharging behaviors were set as one cycle, and, after this cycle was repeated 100 times, capacity retentions of the lithium secondary batteries according to Examples 1 and 2 and Comparative Examples 1 to 4 were measured, and the results thereof are presented in FIG. 3 and Table 2 below.

TABLE 2

|  | Capacity retention in the 100$^{th}$ cycle (%) |
| --- | --- |
| Example 1 | 90 |
| Example 2 | 96 |
| Comparative Example 1 | 84 |
| Comparative Example 2 | 72 |
| Comparative Example 3 | 82 |
| Comparative Example 4 | 83 |

Figure 3:
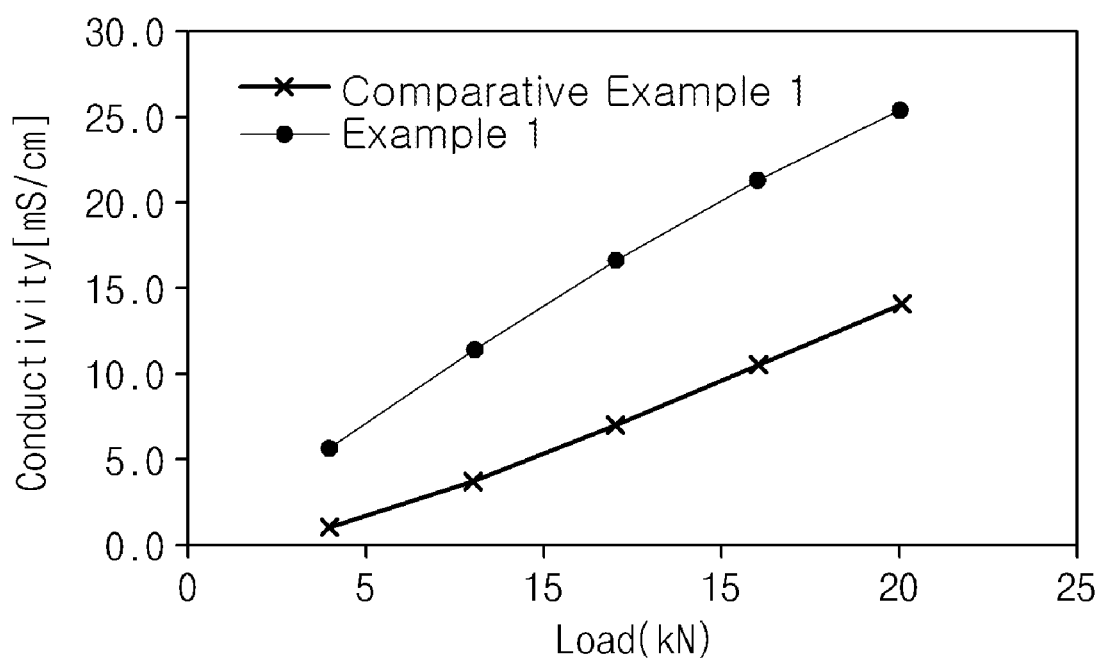
FIG. 3 is a graph illustrating changes in electrical conductivity with rolling load after the positive electrode active materials prepared in Example 1 and Comparative Example 1 are compressed in the form of pellets.

As illustrated in Table 2 and FIG. 3, with respect to the lithium secondary batteries prepared in Examples 1 and 2, capacity retentions in the 100$^{th}$ cycle were 90% or more, but, with respect to the lithium secondary batteries prepared in Comparative Examples 1 to 4, it may be confirmed that capacity retentions in the 100$^{th}$ cycle were about 9% to 22% lower than those of the present invention. Accordingly, it may be confirmed that life characteristics of the lithium secondary batteries prepared in the examples of the present invention were better than those of the lithium secondary batteries prepared in the comparative examples.

The invention claimed is:

1. A positive electrode active material comprising:
a nickel-containing lithium transition metal oxide containing nickel in an amount of 60 mol % or more based on a total number of moles of transition metals excluding lithium; and
a lithium-containing inorganic compound layer formed on a surface of the nickel-containing lithium transition metal oxide,
wherein the positive electrode active material has a first peak in a range of 5 eV or less, a second peak in a range of 7 eV to 13 eV, and a third peak in a range of 20 eV to 30 eV when intensity is measured by X-ray photoelectron spectroscopy, and the first peak has a maximum value of 80% to 120% with respect to the third peak, and
wherein the nickel-containing lithium transition metal oxide is represented by Formula 1:

$$Li_{1+a}(Ni_bCo_cX_dM^1_e)_{1-a}O_2 \quad \text{[Formula 1]}$$

wherein, in Formula 1,
X is at least one selected from the group consisting of manganese (Mn) and aluminum (Al),
M$^1$ is at least one selected from the group consisting of zirconium (Zr), boron (B), cobalt (Co), Al, tungsten (W), magnesium (Mg), cerium (Ce), tantalum (Ta), titanium (Ti), strontium (Sr), barium (Ba), hafnium (Hf), fluorine (F), phosphorus (P), lanthanum (La), and yttrium (Y), and
0≤a≤0.1, 0.6≤b≤1.0, 0≤c≤0.3, 0≤d≤0.3, and 0≤e≤0.1.

2. The positive electrode active material of claim 1, wherein the lithium-containing inorganic compound layer comprises at least one selected from the group consisting of Li$_3$BO$_3$, Li$_3$PO$_4$, LiPO$_3$, LiP$_2$O$_7$, α-Li$_4$B$_2$O$_5$, β-Li$_4$B$_2$O$_5$, Li$_6$B$_4$O$_9$, α-LiBO$_2$, Li$_2$B$_4$O$_7$, Li$_3$B$_7$O$_{12}$, LiB$_3$O$_5$, and Li$_2$B$_8$O$_{13}$.

3. The positive electrode active material of claim 1, wherein the lithium-containing inorganic compound layer has a thickness of 1 nm to 200 nm.

4. The positive electrode active material of claim 1, wherein electrical conductivity, which is measured after the positive electrode active material is prepared in a form of a pellet by compressing the positive electrode active material at a rolling load of greater than 0 kN and equal to or less than 20 kN, is in a range of 5 mS/cm to 30 mS/cm.

5. A method of preparing a positive electrode active material of claim 1, the method comprising:
mixing an aqueous inorganic acid solution with a nickel-containing lithium transition metal oxide containing nickel in an amount of 60 mol % or more based on a total number of moles of transition metals excluding lithium to prepare a suspension having a pH of 8 to 12;
forming a lithium-containing inorganic compound by reacting the lithium transition metal oxide with inorganic acid included in the aqueous inorganic acid solution; and
drying and heat-treating the suspension to form a lithium-containing inorganic compound layer on a surface of the lithium transition metal oxide.

6. The method of claim 5, wherein the aqueous inorganic acid solution has a pH of greater than 6 and equal to or less than 10.

7. The method of claim 5, wherein the aqueous inorganic acid solution comprises at least one selected from the group consisting of boric acid, phosphoric acid, hydrochloric acid, nitric acid, sulfuric acid, carbonic acid, hydrofluoric acid, and hydrobromic acid.

8. The method of claim 5, wherein the nickel-containing lithium transition metal oxide is mixed in an amount of 50 parts by weight to 90 parts by weight based on 100 parts by weight of the aqueous inorganic acid solution.

9. The method of claim 5, wherein the heat treatment is performed at 200° C. to 500° C.

10. A positive electrode for a lithium secondary battery, the positive electrode comprising the positive electrode active material of claim 1.

11. A lithium secondary battery comprising the positive electrode of claim 10.

12. The positive electrode active material of claim 1, wherein the nickel-containing lithium transition metal oxide contains nickel in an amount of 60 mol % to 99 mol % based on the total number of the moles of the transitional metals excluding the lithium.

* * * * *